United States Patent
Yamagishi et al.

(10) Patent No.: US 7,233,785 B2
(45) Date of Patent: Jun. 19, 2007

(54) MOBILE TERMINAL AND REMOTE LOCKING PROGRAM STORAGE MEDIUM

(75) Inventors: Mikimasa Yamagishi, Sapporo (JP); Akira Yokomichi, Sapporo (JP); Yoshihiro Ando, Sapporo (JP); Yuriko Ego, Sapporo (JP); Takeshi Uchiumi, Sapporo (JP); Keisuke Fukumoto, Sapporo (JP); Megumi Yokomichi, Sapporo (JP); Yoko Seki, Sapporo (JP); Takeshi Tsujimoto, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 21 days.

(21) Appl. No.: 11/175,181

(22) Filed: Jul. 7, 2005

(65) Prior Publication Data
US 2006/0211408 A1     Sep. 21, 2006

(30) Foreign Application Priority Data
Mar. 16, 2005  (JP)  ............................. 2005-075760

(51) Int. Cl.
H04M 1/66  (2006.01)
(52) U.S. Cl. ...................... 455/411; 455/410; 455/418; 455/419; 455/558
(58) Field of Classification Search ................ 455/410, 455/411, 419, 418, 558
See application file for complete search history.

(56) References Cited

U.S. PATENT DOCUMENTS

| | | | |
|---|---|---|---|
| 5,600,708 A | | 2/1997 | Meche et al. |
| 5,659,595 A | * | 8/1997 | Chanu et al. ................ 455/411 |
| 5,809,413 A | | 9/1998 | Meche et al. |
| 5,987,609 A | | 11/1999 | Hasebe |
| 2003/0157946 A1 | | 8/2003 | Chong |
| 2004/0006713 A1 | * | 1/2004 | Minemura ................... 713/201 |
| 2004/0203601 A1 | * | 10/2004 | Morriss et al. ............. 455/411 |
| 2004/0266395 A1 | * | 12/2004 | Pailles et al. ............... 455/411 |

FOREIGN PATENT DOCUMENTS

| | | |
|---|---|---|
| EP | 0757502 | 2/1997 |
| EP | 1383351 | 1/2004 |
| JP | 04-095421 | 3/1992 |
| JP | 09-121387 | 5/1997 |

(Continued)

OTHER PUBLICATIONS

European Search Report mailed May 3, 2006 in corresponding European Patent Application No. EP 05254031.

*Primary Examiner*—Lester G. Kincaid
*Assistant Examiner*—Dung Lam
(74) *Attorney, Agent, or Firm*—Staas & Halsey LLP (57) ABSTRACT

A mobile terminal having detachably mounted thereon a recording medium in which user-specific information is written, and besides the recording medium, having terminal-specific information recorded thereon, the mobile terminal performing radio communication with the recording medium mounted thereon, including: a locking instruction determination section which determines whether or not announcement information transmitted to unspecified mobile terminals by radio communication is locking instruction information containing terminal-specific information to instruct locking of a mobile terminal specified by the terminal-specific information; a coincidence determination section which determines whether or not terminal-specific information contained in the locking instruction information coincides with that recorded on the mobile terminal; and a locking section which locks the mobile terminal to disable at least part of functions of the mobile terminal.

4 Claims, 9 Drawing Sheets

FOREIGN PATENT DOCUMENTS

| | | |
|---|---|---|
| JP | 2001-500701 | 1/2001 |
| JP | 2001-186565 | 7/2001 |
| JP | 2002-505056 | 2/2002 |
| JP | 2002-215586 | 8/2002 |
| JP | 2003-070064 | 3/2003 |
| JP | 2003-341481 | 12/2003 |
| JP | 2004-040717 | 2/2004 |
| JP | 2004-127149 | 4/2004 |
| WO | WO 98/12891 | 3/1998 |
| WO | WO 98/59514 | 12/1998 |

\* cited by examiner

MOBILE TERMINAL AND REMOTE LOCKING PROGRAM STORAGE MEDIUM

BACKGROUND OF THE INVENTION

1. Field of the Invention

The present invention relates to a mobile terminal having detachably mounted thereon a recording medium in which user-specific information is written, and besides the recording medium, having terminal-specific information recorded thereon, the mobile terminal performing radio communication with the recording medium mounted thereon, and also relates to a remote locking program storage medium which stores a remote locking program which is executed in such mobile terminal to lock the mobile terminal to disable at least part of functions of the mobile terminal.

2. Description of the Related Art

As mobile terminals, such as mobile telephone and PDA (Personal Data Assistant), are becoming more widely used, mobile telephones equipped with not only a mere telephone function but also various advanced functions, such as electronic mail, video telephony and electronic money, have become mobile composite information processing apparatuses for personal use.

The size and weight of mobile terminals such as these mobile telephones have been increasingly reduced, thus increasing their portability and accelerating the tendency for a user to carry the mobile terminal at all times.

One of the major problems caused by such tendency is improper usage associated with misplacing, loss, theft, and so on.

In order to solve this problem, various techniques have been proposed for remotely locking a mobile terminal to disable the functions of the mobile terminal, when misplacing, loss, theft or the like takes place (refer to Japanese Patent Laid-Open Nos. 9-121387, 2003-70064 and 2004-127149).

With these techniques, if a mobile terminal to be locked is in a normal operating state at the time of locking operation, its functions can be disabled, thus making it possible to prevent improper usage or the like of private information or electronic money except for damage caused by the loss of the mobile terminal itself.

In recent years, mobile terminals having detachably mounted thereon a small card-type medium equipped with a memory function, such as SIM (Subscriber Identity Module) card and USIM (Universal Subscriber Identity Module) card, have been put into practical use.

The telephone number etc. of a subscriber are recorded on this USIM (SIM) card. If the USIM (SIM) card is mounted on another mobile terminal, such mobile terminal with the USIM (SIM) card can be used as a mobile terminal having the telephone number recorded on the USIM (SIM) card.

If a mobile terminal having such USIM (SIM) card mounted thereon is lost, or if the mobile terminal is stolen, then if the USIM (SIM) card mounted on the communication terminal is demounted therefrom, or if another USIM (SIM) card is mounted after the demounting, the mobile terminal no longer responds to a call made with the telephone number of the original user. Thus even if an attempt is made to remotely lock the mobile terminal to disable it, the locking is impossible, thus posing a problem in preventing improper usage.

To address the above problem, the present invention provides a mobile terminal with improved security against misplacing, loss, theft or the like, which has mounted thereon the above USIM (SIM) card or a similar recording medium in which user-specific information such as the telephone number of the user is written, and performs communication with the recording medium mounted thereon, and also provides a storage medium which stores a program which is executed in such mobile terminal to lock the mobile terminal to disable at least part of functions of the mobile terminal.

SUMMARY OF THE INVENTION

The present invention has been made in view of the above circumstances and provides a mobile terminal and a remote locking program storage medium.

The present invention provides a mobile terminal that has detachably mounted thereon a recording medium in which user-specific information is written, and besides the recording medium, has terminal-specific information recorded thereon, the mobile terminal performing radio communication with the recording medium mounted thereon, including: a locking instruction determination section which determines whether or not announcement information (announcement information and signals equivalent to announcement information; hereinafter any concept including the signals equivalent to announcement information will be referred to as announcement information) transmitted to unspecified mobile terminals by radio communication is locking instruction information containing terminal-specific information to instruct locking of a mobile terminal specified by the terminal-specific information; a coincidence determination section which determines, when the locking instruction determination section determines that this transmitted announcement information is the locking instruction information, whether or not terminal-specific information contained in the locking instruction information coincides with that recorded on the mobile terminal; and a locking section which locks the mobile terminal to disable at least part of functions of the mobile terminal, in response to the determination of the coincidence determination section that there exists a coincidence therebetween.

In recent mobile terminals which operate with USIM (SIM) card mounted thereon, while the telephone number of the mobile terminal is recorded on the USIM (SIM) card, terminal-specific number (production number) is recorded on the mobile terminal itself rather than on the USIM (SIM) card. In mobile terminal communication systems, there are channels in which the telephone number of the mobile terminal is specified to allow only the particular mobile terminal with the telephone number to respond. In addition, there exist channels for announcement information which all subscriber terminals located within the coverage area of the base station can receive. The announcement information serves to announce information common to all the mobile terminals which are under the control of the base station transmitting the announcement information. The announcement information includes notification of the fact that the mobile terminals concerned are under the control of the base station.

The present invention has been devised by taking account of the above two points: (1) terminal-specific number (production number) is invariable even when the USIM (SIM) card is demounted therefrom, or even when another USIM (SIM) card is mounted after the demounting; (2) there exists channels which all the subscriber terminals can receive.

Specifically, according to the present invention, if the terminal-specific information of a mobile terminal coincides with locking instruction information transmitted via the announcement information channel which all the subscriber terminals can receive, to instruct locking of the mobile terminal by specifying the terminal-specific information, the mobile terminal is locked. Accordingly, even when the recording medium such as USIM (SIM) card is demounted from the mobile terminal, or when another card is mounted, the mobile terminal can be remotely locked to disable it.

The above mobile terminal of the present invention preferably includes a locking completion reporting section which reports the completion of locking by radio communication in response to completion of locking by the above locking section.

With the reporting of the completion of locking, it can be confirmed that the particular mobile terminal has been locked, thus increasing a feeling of security.

In the configuration which includes the locking completion reporting section, the locking completion reporting section preferably notifies the user-specific information written in the recording medium mounted on the mobile terminal, when reporting the completion of locking.

With this arrangement, when the original recording medium is replaced with another one, a useful clue to identifying the person who committed the crime is obtainable, thus serving for crime prevention.

In addition, the mobile terminal of the present invention preferably includes a location information acquiring section which acquires location information indicating the current location, whereby the locking completion reporting section also notifies the location information indicating the current location when reporting the completion of locking.

With this arrangement, the current location of the mobile terminal can be identified.

According to the present invention, there is provided a remote locking program storage medium which stores a remote locking program which is executed in a mobile terminal having a program executing function to lock the mobile terminal to disable at least part of functions of the mobile terminal, the mobile terminal having detachably mounted thereon a recording medium in which user-specific information is written, and besides the recording medium, having terminal-specific information recorded thereon, the mobile terminal performing radio communication with the recording medium mounted thereon, the remote locking program storage medium storing the remote locking program which adds to the mobile terminal a remote locking function including: a locking instruction determination section which determines whether or not announcement information transmitted to unspecified mobile terminals by radio communication is locking instruction information containing terminal-specific information to instruct the locking of a mobile terminal specified by the terminal-specific information; a coincidence determination section which determines, when the locking instruction determination section determines that this transmitted announcement information is the locking instruction information, whether or not terminal-specific information contained in the locking instruction information coincides with that recorded on the mobile terminal; and a locking section which locks the mobile terminal to disable at least part of functions of the mobile terminal, in response to the determination by the coincidence determination section that there exists a coincidence therebetween.

In recent mobile terminals such as a mobile telephone, programs are downloaded into the mobile terminal via radio wave to add an additional function to the mobile terminal or to improve the existing function. Thus, by arranging the above described remote locking program, it becomes possible to build a system in which a function according to the present invention is added to the mobile terminal.

According to the present invention, with respect to a mobile terminal which has mounted thereon a recording medium in which user-specific information such as the telephone number of the user is written, and performs communication with the recording medium mounted thereon, security against misplacing, loss, theft or the like is improved.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

Preferred embodiments of the present invention will be described below.

Figure 1:
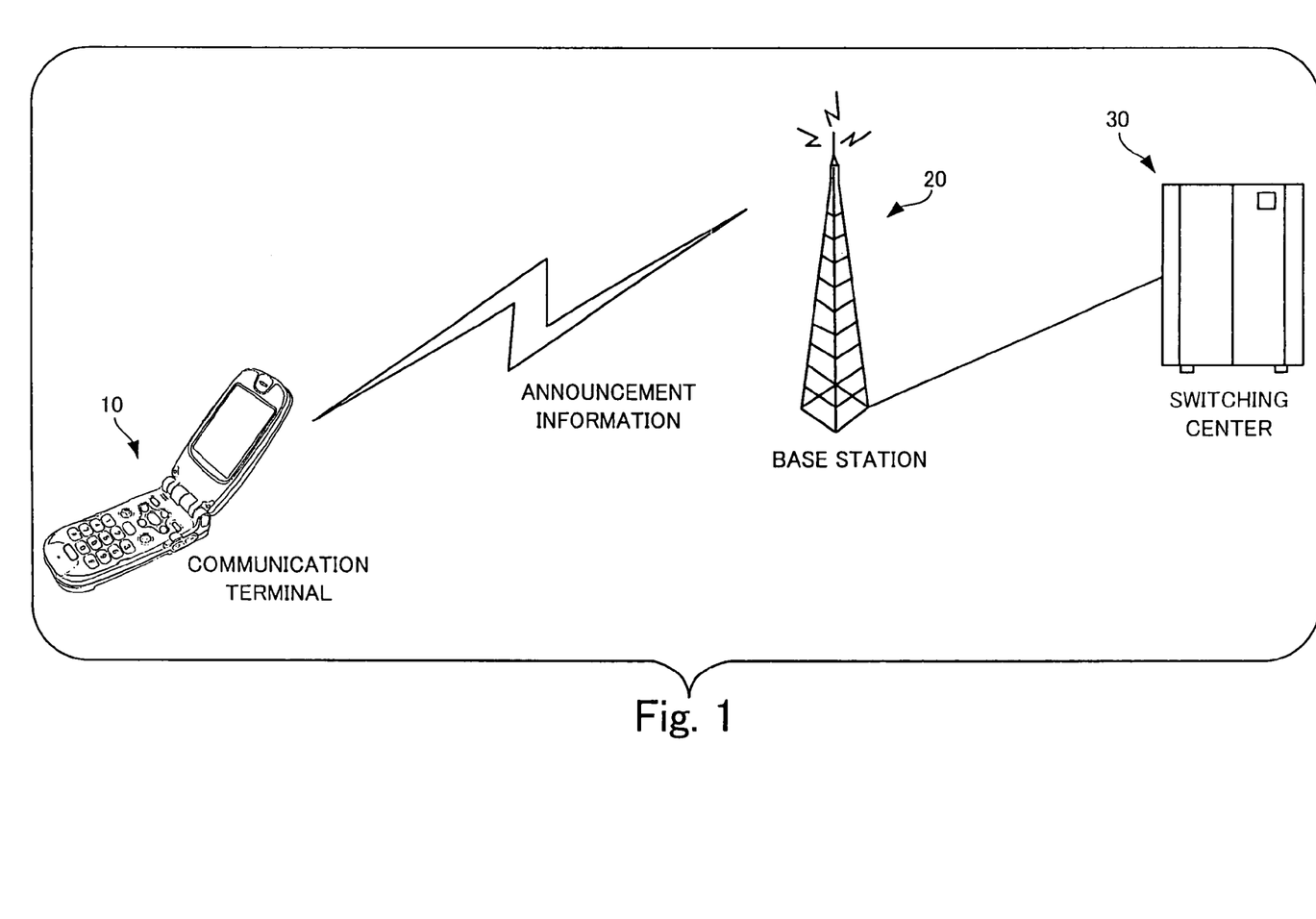
FIG. 1 is a view schematically showing a configuration of a network system including a communication terminal according to an embodiment of the present invention.

FIG. 1 is a view schematically showing a configuration of a network system including a communication terminal according to an embodiment of the present invention.

FIG. 1 illustrates a communication terminal 10, a base station 20 depicted as an antenna, and a switching center 30 depicted as a switching system. According to the present embodiment, announcement information transmitted from the base station 20 is used. Therefore, in FIG. 1, "announcement information" is described on a radio communication path between the base station 20 and the communication terminal 10. However, not only announcement information but also information on telephone calls, e-mail information, and so on are exchanged between the base station 20 and the communication terminal 10.

When a call is originated from the communication terminal 10, the call information is transmitted to the base station 20 and sent via the switching center 30 to another base station which covers the area where the communication terminal or the like of the other party is located, and then transmitted from the base station to the communication terminal or the like of the other party. When the communication terminal 10 shown in FIG. 1 receives a call, transmission is similarly performed; e-mail exchange is also similarly performed. It is noted here that there are two types of e-mail services: (1) one called SMS (Short Message Service) in which using the telephone number of the other party's mobile terminal or the like as an address an e-mail is directly transmitted to the particular mobile terminal without going through a mail server; (2) another service in which an e-mail is once stored in a mail server, and then by requesting the transmission of the e-mail stored in the mail server, the recipient terminal can receive the e-mail.

In the switching center 30, there is managed a table which associates the user and telephone number with the terminal-specific number (production number: IMEI (International Mobile Equipment Identity)) of the communication terminal owned by the user. When the user notifies the loss of the communication terminal, the production number (IMEI) of the lost communication terminal is set as announcement information. With conventional announcement information, the setting of production number (IMEI) is not taken in consideration. In the announcement information employed herein, an additional sector is provided in which production number (IMEI) can be set. The production numbers (IMEI) of multiple communication terminals are to be preferably set in that announcement information. The base station 20 sends the announcement information having the production numbers (IMEI) which have been set in the switching center 30 to all subscriber communication terminals.

When the mobile terminal the loss of which has been notified (assume that it is the mobile terminal 10 shown in FIG. 1) receives the announcement information, the mobile terminal locks itself to disable it as will be described later.

Figure 2:
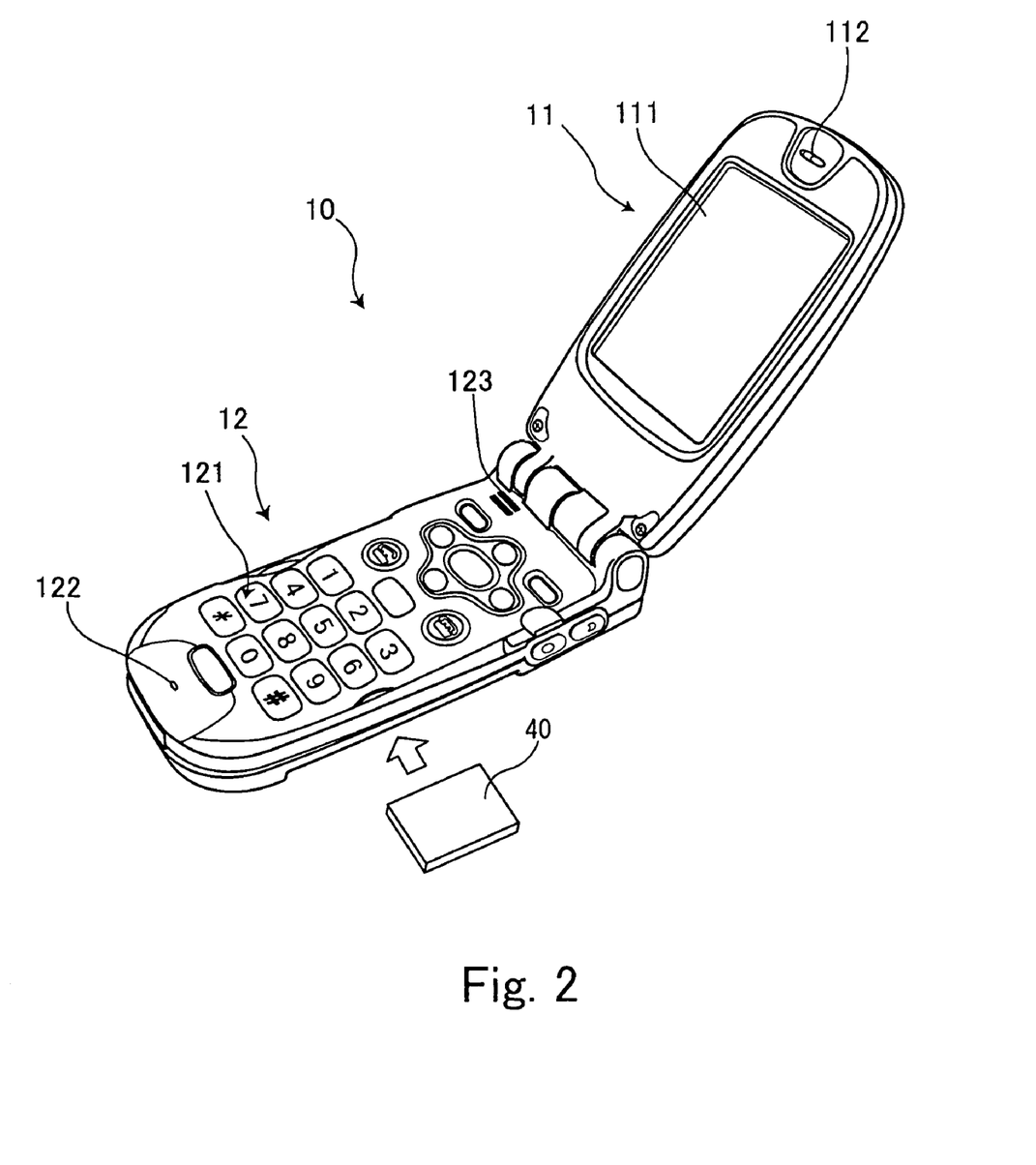
FIG. 2 is an external perspective view of the communication terminal according to the present embodiment as shown in FIG. 1.

FIG. 2 is an external perspective view of the communication terminal 10 according to the present embodiment as shown in FIG. 1.

The communication terminal 10 is composed of an upper housing 11 and a lower housing 12 which are openable and closable relative to each other. The upper housing 11 includes an LCD 111 on which various images are displayed, and an earpiece 112 which is held close to the ear and has a small loudspeaker incorporated therein. The lower housing 12 includes: various digit keys 121 used for the inputting of telephone number and e-mail, and for the setting of various modes; a mouthpiece 122 placed in the vicinity of the mouth, having incorporated therein a microphone to pick up the user's voice; a speaker section 123 having incorporated therein a loudspeaker large enough to make it possible to hear the sounds with the face distanced from the communication terminal 10.

Also, a USIM card 40 is detachably mounted on the communication terminal 10. On the USIM card 40, there is recorded subscriber information (IMSI: International Mobile Subscriber Identity) including the telephone number of the subscriber. The USIM card 40 is mounted on the communication terminal 10 to allow it to work as a communication terminal having the particular telephone number.

The communication terminal 10 has a telephone call function of exchanging telephone calls by radio communication and a function to exchange e-mail including SMS.

Figure 3:
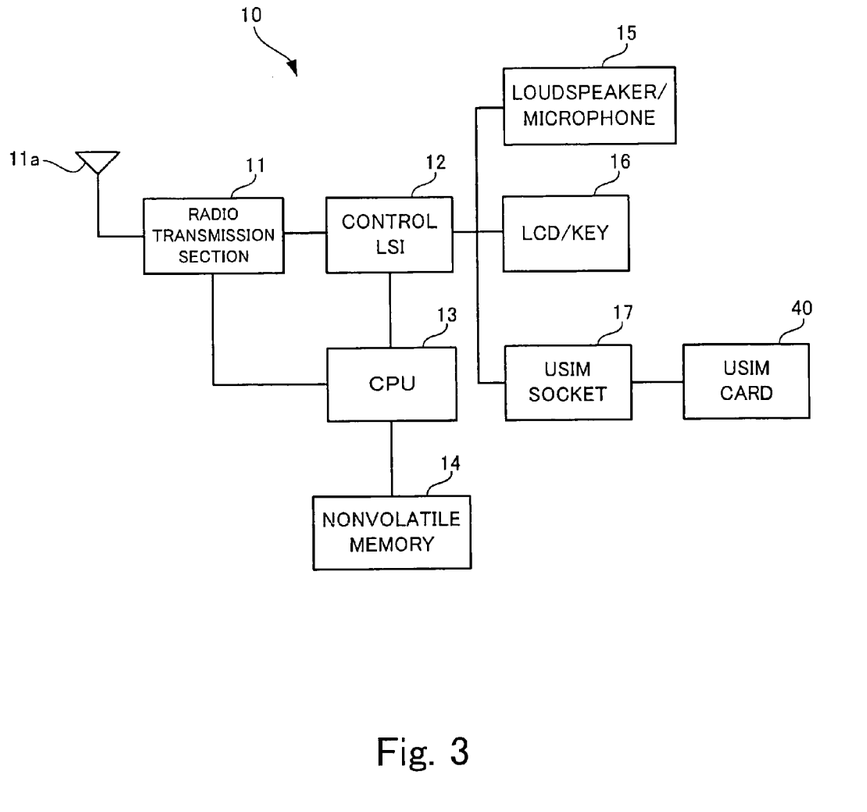
FIG. 3 is a view showing an internal configuration of the communication terminal whose external appearance is shown in FIG. 2.

FIG. 3 is a view showing an internal configuration of the communication terminal whose external appearance is shown in FIG. 2.

Illustrated in this drawing is a radio transmission section 11, control LSI 12, CPU 13, nonvolatile memory 14, loudspeaker/microphone 15, LCD/key 16, USIM socket 17, and USIM card 40.

On the USIM card 40, there is recorded subscriber information (IMSI) including the telephone number of the subscriber. The USIM card 40, attached to the USIM socket 17, is accessed by the control LSI 12.

The radio transmission section 11 is a block which performs radio communication with the outside via an antenna 11a. Under the control of the CPU 13, the control LSI 12 performs the interfacing and processing of signals exchanged between the radio transmission section 11 and loudspeaker/microphone 15, between the radio transmission section 11 and LCD/key 16, and between the CPU 13 and loudspeaker/microphone 15, LCD/key 16 and USIM card 40.

The CPU 13 executes programs to control the radio transmission section 11 and control LSI 12, and acquires information from the LCD/key 16 and USIM card 40 via the control LSI 12.

The nonvolatile memory 14 is used for storage of programs executed in the CPU 13, and so on.

The loudspeaker/microphone 15, used mainly when the telephone function of the communication terminal 10 operates, serves to send the user's voice and to receive the voice of the other party.

The LCD/key 16, corresponding to the LCD 111 and various digit keys 121 whose external appearance is shown in FIG. 2, serves to display images and to sense the user's key operation.

Figure 4:
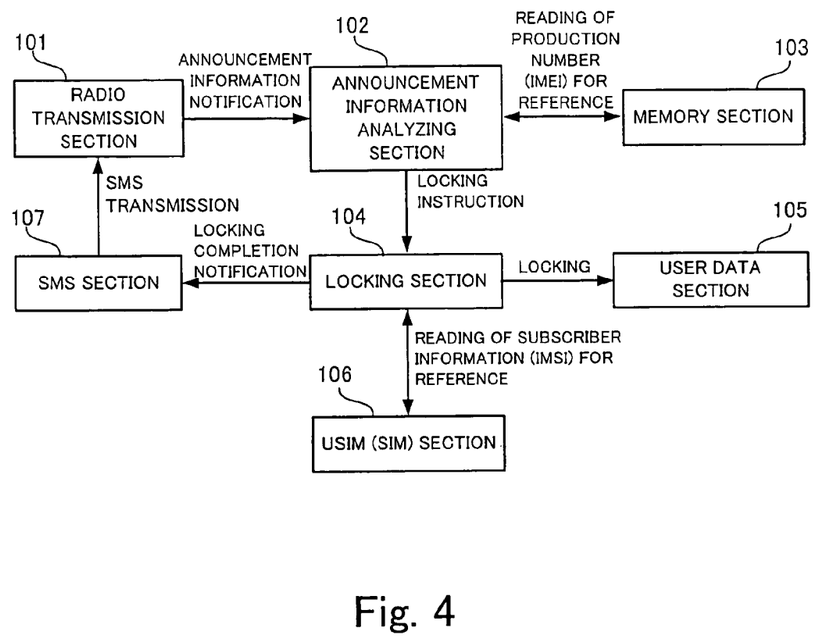
FIG. 4 is a view showing function blocks necessary for implementing the functions specific to the present embodiment.

FIG. 4 is a view showing function blocks obtained by combining the hardware of the communication terminal 10 shown in FIG. 3 with the programs executed by the CPU 13 of the communication terminal 10. The function blocks represent functions of the present embodiment.

Illustrated in FIG. 4 are a radio transmission section 101, announcement information analyzing section 102, memory section 103, locking section 104, user data section 105, USIM (SIM) section 106, and SMS section 107.

The radio transmission section 101, whose hardware corresponds to the radio transmission section 11 and antenna 11a shown in FIG. 3, serves to receive announcement information, to send it to the announcement information analyzing section 102, and also serves to transmit locking completion notification to be described later.

The announcement information analyzing section 102, whose hardware corresponds mainly to the CPU 13 shown in FIG. 3, operates according to the program executed by the CPU 13; as described later, the section 102 determines whether or not it is necessary to lock the mobile terminal, and if so, the locking section 104 is instructed to perform the locking. The locking section 104, whose hardware also corresponds mainly to the CPU 13 shown in FIG. 3, operates according to the program executed by the CPU 13.

The user data section 105, whose hardware corresponds to the nonvolatile memory 14 and CPU 13 which accesses the memory 14 shown in FIG. 3, has recorded thereon various user data written in by the proper user of the communication terminal. The locking section 104 locks the user data section 105 in response to the instruction from the announcement information analyzing section 102. The user data section 105 thus locked deletes the user data recorded thereon all at once and inhibits any access from the outside, thereby preventing a third party attempting to improperly use the user data from accessing it.

The hardware of the USIM (SIM) section 106 corresponds to the USIM socket 17 and USIM card 40 shown in FIG. 3. The subscriber information (IMSI) is read out from the section 106 for reference.

When the locking is completed, the locking section 104 requests the SMS section 107 to send the locking completion notification. The SMS section 107, serving to send SMS (Short Message Service) being a mail service which sends e-mail directly to the other party without going through a mail server, receives the request from the locking section 104, generates SMS signal according to the request content, and supplies the SMS signal to the radio transmission section 101. Then the radio transmission section 101 transmits to the network the SMS signal destined to the switching center 30 (refer to FIG. 1).

Figure 5:
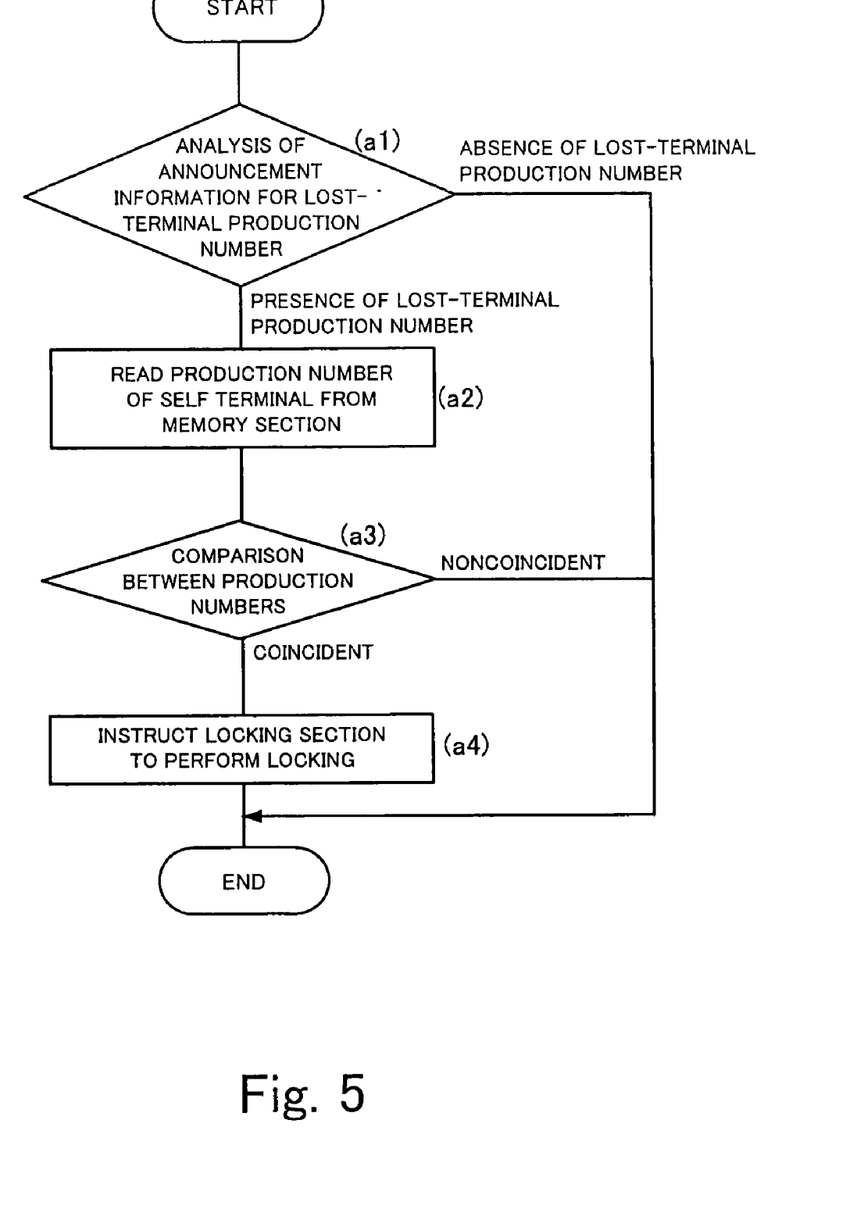
FIG. 5 is a flowchart showing the process of the announcement information analyzing section.

FIG. 5 is a flowchart showing the process of the announcement information analyzing section 102.

In this section, it is analyzed whether or not the announcement information received from the radio transmission section 101 shown in FIG. 4 contains any lost-terminal production number (step a1). If not, no operation is performed, and the process is terminated. On the other hand, if so, the production number of the communication terminal itself is read out from the memory section 103 shown in FIG. 4 (step a2), and then it is determined whether or not the lost-terminal production number contained in the announcement information coincides with the production number of the communication terminal itself read out from the memory section 103 (step a3). If not, the process is terminated; if so, the locking section 104 of FIG. 4 is instructed to perform the locking (step a4).

Figure 6:
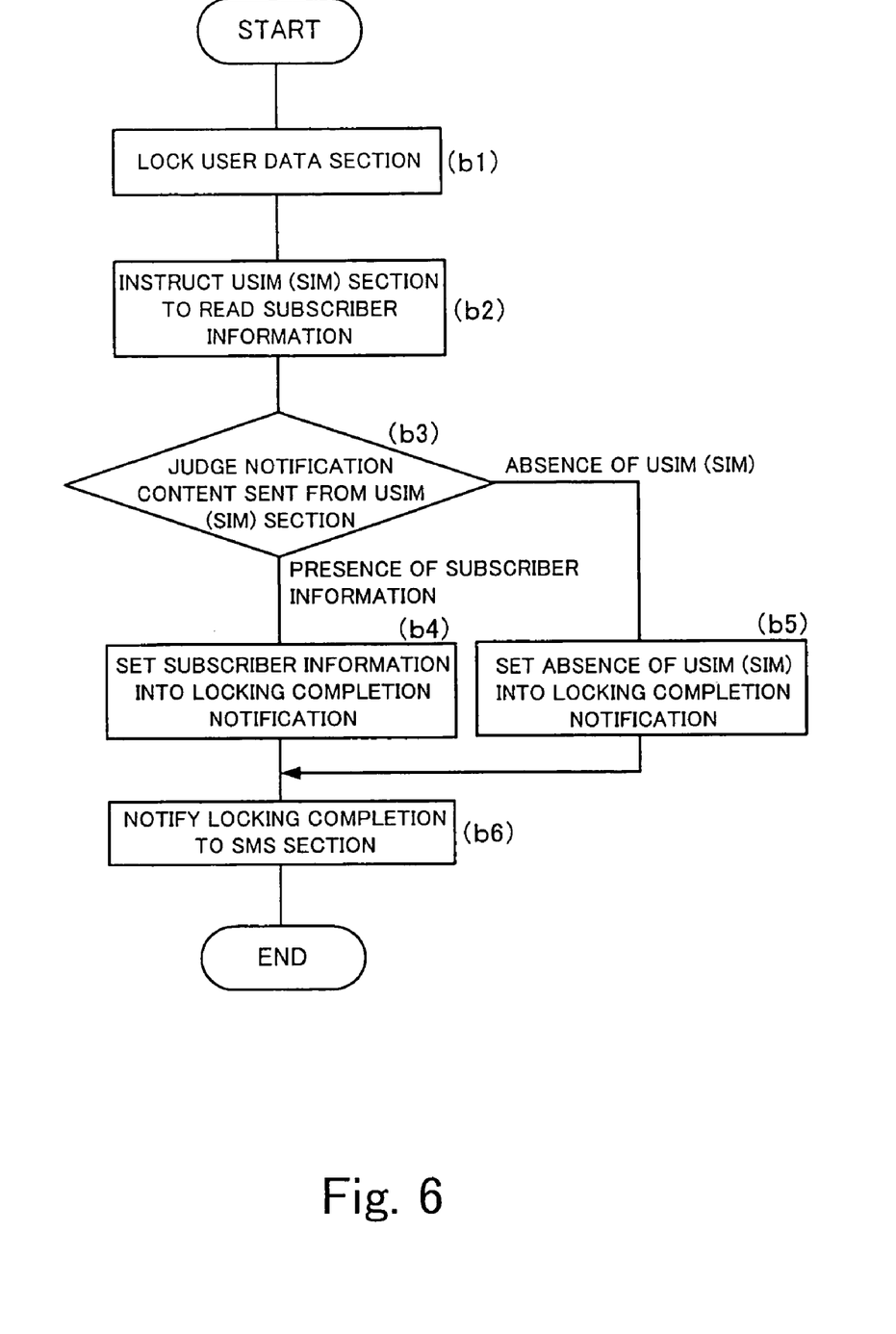
FIG. 6 is a flowchart showing the process of the locking section.

FIG. 6 is a flowchart showing the process of the locking section 104.

The locking section 104 receives the locking instruction from the announcement information analyzing section 102 shown in FIG. 4, and then locks the user data section 105 shown in FIG. 4 (step b1). The user data section 105 deletes the user data stored therein all at once in response to the locking.

Subsequently, the locking section 104 instructs the USIM (SIM) section 106 to read the subscriber information and then receives it. Otherwise, if there does not exist any USIM card 40 (refer to FIGS. 2 and 3), the locking section 104 receives data indicating absence of the USIM (SIM) card (step b2). As such, the locking section 104 judges the notification content sent from the USIM (SIM) section (step b3). If there exists subscriber information, it is set into the locking completion notification (step b4). Otherwise, if not, data indicating absence of the USIM (SIM) card is set into the locking completion notification (step b5). Then the locking completion notification is sent to the SMS section 107. As described above, when receiving the locking completion notification, the SMS section 107 generates the SMS signal representing the locking completion notification. The SMS signal is sent to the network via the radio transmission section 101.

A communication terminal according to a second embodiment of the present invention will now be described.

Descriptions of the second embodiment given with reference to FIGS. 1 and 2 are identical to those of the above described embodiment, and hence repeated drawings and explanation thereof are omitted here. The communication terminal according to the second embodiment is also referred to as a communication terminal 10.

Figure 7:
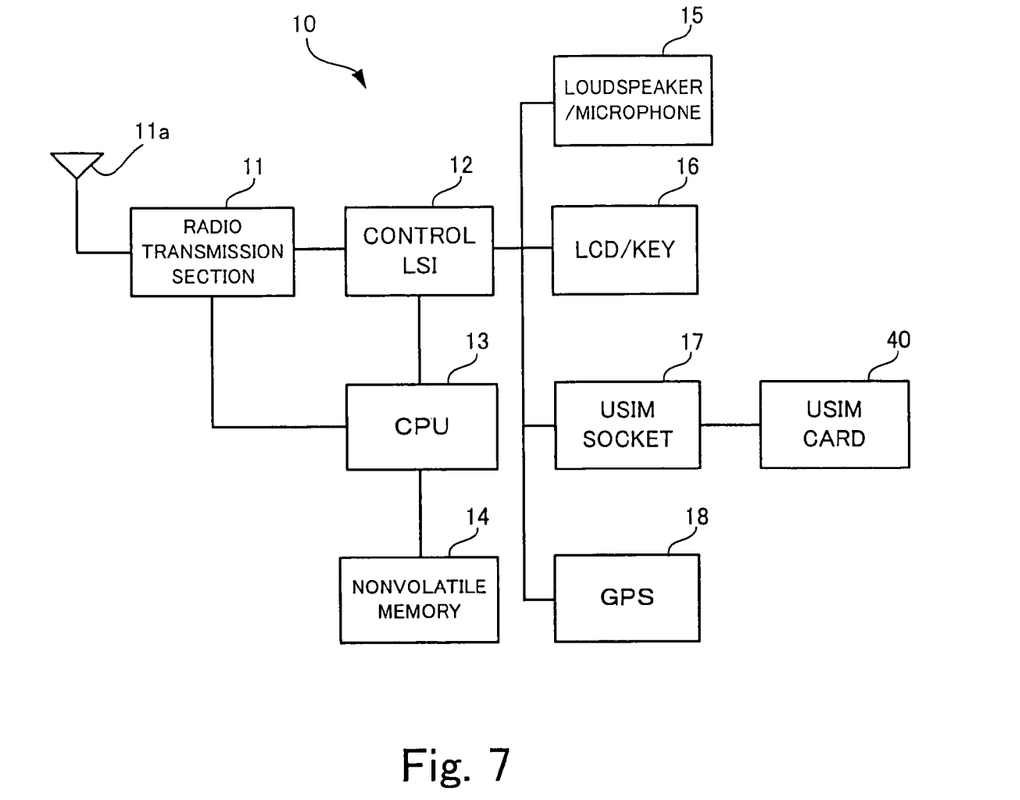
FIG. 7 is a view showing an internal configuration of a communication terminal according to a second embodiment.

FIG. 7 is a view showing an internal configuration of the communication terminal according to the second embodiment.

The same reference numerals are applied to parts corresponding to the internal configuration of the communication terminal according to the first embodiment shown in FIG. 3, and only the difference from FIG. 3 will be described.

Referring to FIG. 7, a block GPS 18 is added to FIG. 3.

The GPS 18, compliant with GPS (Global Positioning System), serves to acquire the information on the current location of communication terminal. The GPS 18 sends the location information to the control LSI 12 in response to its instruction. Then the control LSI 12 sends the location information thus received to the CPU 13.

Figure 8:
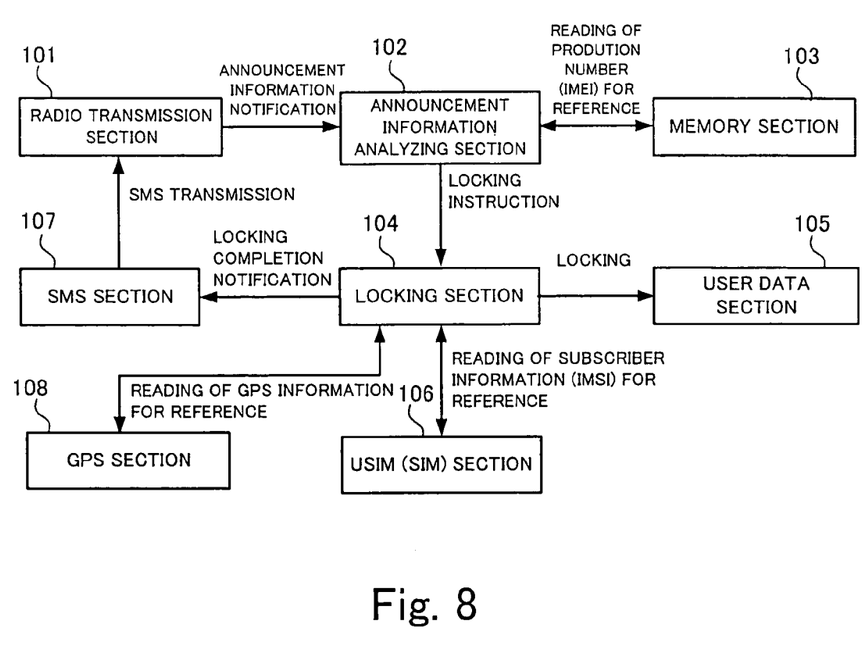
FIG. 8 is a view showing function blocks necessary for implementing the functions specific to the second embodiment.

FIG. 8 is a view showing function blocks obtained by combining the hardware of the communication terminal 10 shown in FIG. 7 with the programs executed by the CPU 13 of the communication terminal 10. The function blocks are represent functions of the second embodiment.

FIG. 8 is a drawing corresponding to FIG. 4 according to the first embodiment. Similarly to FIG. 7, the same reference numerals are applied to parts corresponding to FIG. 4, and the difference from FIG. 4 will be described.

Referring to FIG. 8, there is illustrated a GPS section 108 corresponding to the hardware block GPS 18 shown in FIG. 7, as compared to FIG. 4. The location information acquired by the GPS section 108 is read out by the locking section 104 for reference.

Figure 9:
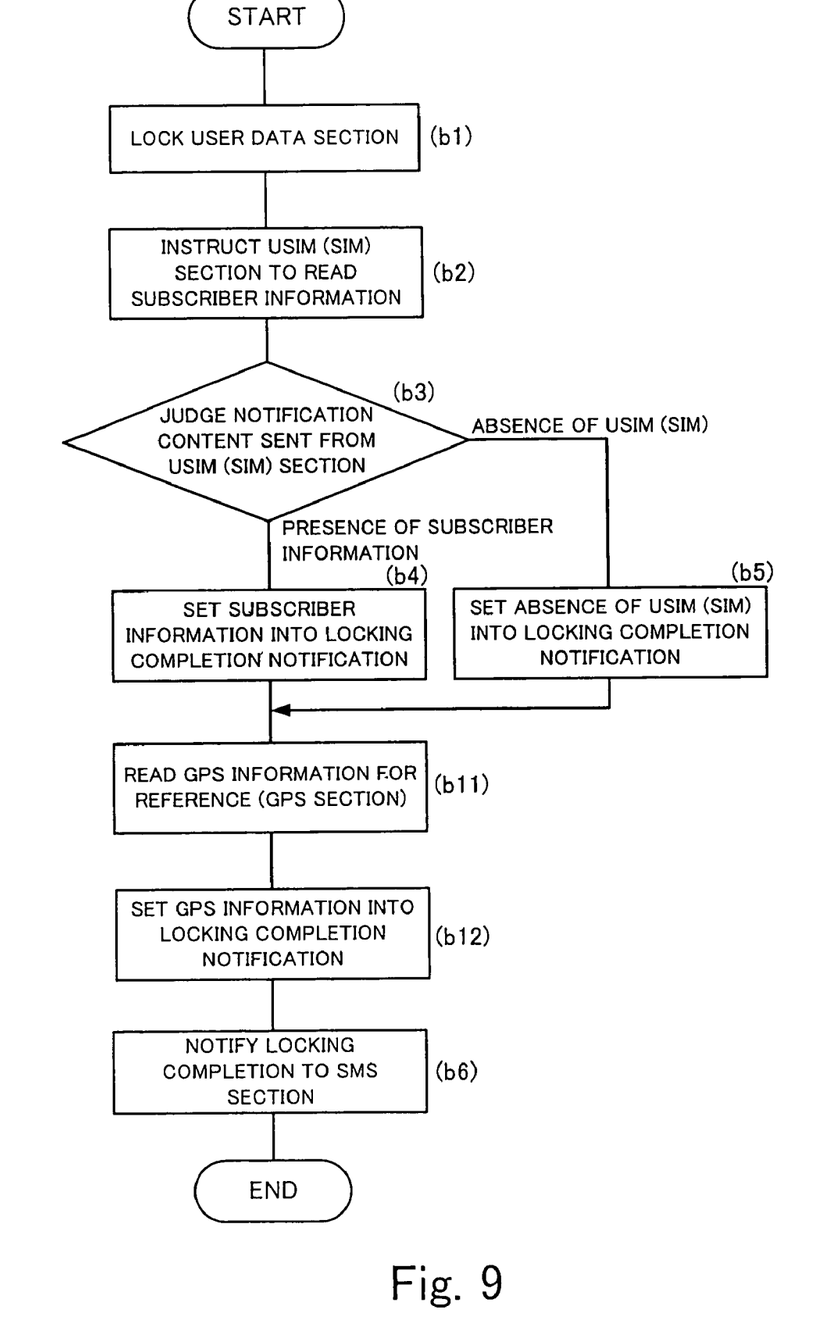
FIG. 9 is a flowchart showing the process of the locking section according to the second embodiment.

FIG. 9 is a flowchart showing the process of the locking section according to the second embodiment. Similarly, the same reference numerals are applied to steps corresponding to the flowchart of FIG. 6 showing the process of the locking section according to the first embodiment, and the difference from FIG. 6 will be described.

The process steps of the announcement information analyzing section 102 according to the second embodiment are identical to those of the announcement information analyzing section 102 of the first embodiment. Thus FIG. 5 and the explanation thereof is to be referred to again with respect to the process steps of the announcement information analyzing section 102 and hence repeated drawing and explanation thereof are omitted here.

Among the process steps of FIG. 9, steps b1 to b5 are identical to those of FIG. 6, and hence repeated explanation thereof is omitted here.

In step b11, the location information is read out for reference from the GPS section 108 shown in FIG. 8. Then, in addition to the setting of the subscriber information (step b4) or the setting of data indicating absence of the USIM (SIM) card (step b5), the location information supplied from the GPS section is also set into the locking completion notification (step b12). The subsequent operations are identical to those of the first embodiment. In this case, by receiving the SMS mail, the switching center can recognize the completion of locking, and also the current location of the lost communication terminal, together with the subscriber information.

Still preferably the locking section 104 reads out periodically the location information from the GPS section 108 after the locking completion notification is sent, to notify the location information to the SMS section 107; the location information mail is then transmitted to the radio transmission section 101.

In this way, with each of the embodiments described above, if the communication common carrier is notified of the loss of a communication terminal, then even if the lost terminal can not receive any call (cases including the change of telephone number by replacing the USIM (SIM) card or the absence of the card) but if the terminal can receive the announcement information, the terminal can be locked to prevent improper usage of the user data.

What is claimed is:

1. A mobile terminal having detachably mounted thereon a recording medium in which user-specific information is written, and besides the recording medium, having terminal-specific information recorded on the mobile terminal, the mobile terminal performing radio communication with the recording medium mounted thereon, comprising:

a locking instruction determination section which determines whether or not announcement information which is transmitted from a serving base station to the mobile terminals by radio communication is locking instruction information containing terminal-specific information to instruct locking of a mobile terminal specified by the terminal-specific information;

a coincidence determination section which determines, when the locking instruction determination section determines that this transmitted announcement information is the locking instruction information, whether or not terminal-specific information contained in the locking instruction information coincides with that recorded on the mobile terminal;

a locking section which locks the mobile terminal to disable at least part of functions of the mobile terminal, in response to the determination by the coincidence determination section that there exists a coincidence therebetween; and a locking completion reporting section which reports the completion of locking by radio communication in response to completion of locking by the locking section, wherein the locking completion reporting section also notifies the user-specific information written in the recording medium mounted on the mobile terminal, when reporting the completion of locking.

2. The mobile terminal according to claim 1, further comprising a location information acquiring section which acquires location information indicating the current location of the mobile terminal, wherein the locking completion reporting section also notifies the location information indicating the current location when reporting the completion of locking.

3. A computer-readable medium encoded with a remote locking program comprising instructions for causing the program to execute, in a mobile terminal having a program executing function to lock the mobile terminal to disable at least part of functions of the mobile terminal, the mobile terminal having detachably mounted thereon a recording medium in which user-specific information is written, and besides the recording medium, having terminal-specific information recorded on the mobile terminal, the mobile terminal performing radio communication with the recording medium mounted thereon, the following:

a locking instruction determination step which determines whether or not announcement information transmitted to unspecified mobile terminals by radio communication is locking instruction information containing terminal-specific information to instruct the locking of a mobile terminal specified by the terminal-specific information;

a coincidence determination step which determines, when the locking instruction determination step determines that this transmitted announcement information is the locking instruction information, whether or not terminal-specific information contained in the locking instruction information coincides with that recorded on the mobile terminal;

a locking step which locks the mobile terminal to disable at least part of functions of the mobile terminal, in response to the determination by the coincidence determination section that there exists a coincidence therebetween; and locking completion reporting step which reports the completion of locking by radio communication in response to completion of locking by the locking step, wherein the locking completion reporting step also notifies the user-specific information written in the recording medium mounted on the mobile terminal, when reporting the completion of locking.

4. The medium according to claim 3, further comprising a location information acquiring step which acquires location information indicating the current location of the mobile terminal, wherein the locking completion reporting step also notifies the location information indicating the current location when reporting the completion of locking.

* * * * *

UNITED STATES PATENT AND TRADEMARK OFFICE
CERTIFICATE OF CORRECTION

PATENT NO. : 7,233,785 B2  Page 1 of 1
APPLICATION NO. : 11/175181
DATED : June 19, 2007
INVENTOR(S) : Mikimasa Yamagishi et al.

It is certified that error appears in the above-identified patent and that said Letters Patent is hereby corrected as shown below:

IN THE CLAIMS

Column 9, line 4, delete "terminals" and insert --terminal--

Signed and Sealed this

Thirteenth Day of May, 2008

JON W. DUDAS
*Director of the United States Patent and Trademark Office*